(12) United States Patent
Yoo et al.

(10) Patent No.: US 9,061,420 B2
(45) Date of Patent: Jun. 23, 2015

(54) METHOD AND SYSTEM FOR EXTRACTING INTENDED TORQUE FOR WEARABLE ROBOT

(71) Applicant: Hyundai Motor Company, Seoul (KR)

(72) Inventors: Su Jung Yoo, Incheon (KR); Woo Sung Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 29 days.

(21) Appl. No.: 13/844,792

(22) Filed: Mar. 16, 2013

(65) Prior Publication Data

US 2014/0172169 A1    Jun. 19, 2014

(30) Foreign Application Priority Data

Dec. 17, 2012 (KR) .................. 10-2012-0147921

(51) Int. Cl.
*G06F 19/00* (2011.01)
*B25J 9/16* (2006.01)

(52) U.S. Cl.
CPC .............. *B25J 9/1633* (2013.01); *Y10S 901/09* (2013.01)

(58) Field of Classification Search
CPC ............................. B25J 9/1656; Y10S 901/09
USPC ................................................ 700/245–264
See application file for complete search history.

(56) References Cited

U.S. PATENT DOCUMENTS

| | | | |
|---|---|---|---|
| 5,432,417 A * | 7/1995 | Takenaka et al. ........ 318/568.12 |
| 5,818,651 A * | 10/1998 | Nomura ..................... 360/78.06 |
| 7,153,242 B2 * | 12/2006 | Goffer ............................ 482/66 |
| 7,313,463 B2 * | 12/2007 | Herr et al. ...................... 700/245 |
| 7,390,309 B2 * | 6/2008 | Dariush ............................ 601/5 |
| 7,942,833 B2 * | 5/2011 | Yasuhara ....................... 600/595 |
| 8,070,700 B2 * | 12/2011 | Kazerooni et al. .............. 602/16 |
| 8,147,436 B2 * | 4/2012 | Agrawal et al. ................. 602/16 |
| 8,347,710 B2 * | 1/2013 | Scott et al. ................. 73/379.01 |
| 8,694,159 B2 * | 4/2014 | Oaki et al. ..................... 700/253 |
| 2004/0158175 A1 * | 8/2004 | Ikeuchi et al. ..................... 601/5 |
| 2007/0200525 A1 * | 8/2007 | Kanaoka .................. 318/568.21 |
| 2008/0255488 A1 * | 10/2008 | Agrawal et al. ................. 602/23 |
| 2010/0204627 A1 * | 8/2010 | Kazerooni et al. .............. 602/16 |
| 2013/0073085 A1 * | 3/2013 | Oaki et al. ..................... 700/258 |

FOREIGN PATENT DOCUMENTS

| | | |
|---|---|---|
| JP | 3215841 B2 | 10/2001 |
| KR | 1020080079590 | 9/2008 |
| KR | 10-2011-0092890 A | 8/2011 |

OTHER PUBLICATIONS

Eom, K.S., et al.: "Design of Force Estimator Based on Disturbance Observer", Trans. KIEE, vol. 48A, No. 9, Sep. 1999, pp. 1140-1146, with English abstract.
Korean Office Action issued in Korean Application No. 10-2012-0147921, dated Nov. 21, 2013.

* cited by examiner

*Primary Examiner* — Bhavesh V Amin
(74) *Attorney, Agent, or Firm* — McDermott, Will & Emery LLP

(57) ABSTRACT

A method for extracting intended torque for a wearable robot includes a motor torque calculating step, a link rotation calculating step and an intended torque calculating step. In the motor torque calculating step, motor torque is calculated from the angular velocity of rotation of the motor. In the link rotation calculating step, the angular velocity of rotation of the link is calculated. In the intended torque calculating step, the motor torque and the angular velocity of rotation of the link are substituted into a disturbance observer, and an estimated value of the intended torque applied by a wearer is calculated.

5 Claims, 3 Drawing Sheets

METHOD AND SYSTEM FOR EXTRACTING INTENDED TORQUE FOR WEARABLE ROBOT

CROSS-REFERENCE TO RELATED APPLICATION

This application is based on and claims benefit of priority to Korean Patent Application No. 10-2012-0147921, filed on Dec. 17, 2012 in the Korean Intellectual Property Office, the entire contents of which are hereby incorporated by reference.

TECHNICAL FIELD

The present inventive concept relates to a method and system for extracting intended torque for a wearable robot, more particularly to a method and system which calculates the intended torque of a wearer using a disturbance observer, and friction compensation using an extended-kalman filter.

BACKGROUND

As high-load work is increasingly common in industrial fields, there is an increased need to study measures that can reduce a load applied to human joints in order to increase the convenience of a worker. According to this demand, a wearable robot, which a worker wears and which moves, has been proposed as one such measure. The present inventive concept proposes a technique for extracting intended torque of a wearer so as to allow the wearable robot to accurately move according to the intent of the wearer.

In a method and apparatus for compensating a stick motion generated at a quadrant changing position in numerical control machine tools disclosed in Korean Unexamined Patent Application Publication No. 10-2008-0079590, a real position estimator estimates a real position of a movable body corresponding to a position instruction signal to generate a real position signal. A differentiator differentiates the real position signal to obtain a speed signal. Then, an integrator integrates the speed signal, thereby generating a displacement signal from a position at which a moving direction of the movable body is reversed. An absolute value calculator obtains an absolute value of the displacement signal. A friction characteristic estimator obtains a rate of change of displacement of friction force or friction torque. A multiplier multiplies the rate of change of the displacement by the speed signal, and obtains a rate of change of time. An integrator 28 integrates the rate of change of time, and estimates the friction force or the friction torque.

However, in spite of this measure, a measure is still required for realizing proper movement corresponding to the intent of the wearer by obtaining friction in real driving in real time, and by compensating a driver with the obtained friction.

Further, a force-torque sensor is generally attached to the wearable robot in order to measure torque applied by a user. This sensor increases the weight of a mechanism as well as the price.

Thus, since the force-torque sensor is used to calculate the wearer-intended torque, a measure to effectively calculate the wearer-intended torque without using this expensive sensor is required.

The foregoing is intended merely to aid in the understanding of the background of the present inventive concept, and is not intended to mean that the present inventive concept falls within the purview of the related art that is already known to those skilled in the art.

DOCUMENTS OF RELATED ART (Patent Document 1) Korean Unexamined Patent Application Publication No. 10-2008-0079590

SUMMARY

Accordingly, the present inventive concept has been made keeping in mind the above problems occurring in the related art, and the present inventive concept is intended to propose a method and system for extracting intended torque for a wearable robot, which calculates the intended torque of a wearer using a disturbance observer, and calculates friction compensation using an extended-kalman filter.

An aspect of the present inventive concept relates to a system for extracting intended torque for a wearable robot, which includes a motor sensor configured to measure an angle or angular velocity of rotation of a motor driving a joint. A link sensor is configured to measure an angle or angular velocity of rotation of a link connected to the joint. A controller is configured to substitute motor torque calculated from the angular velocity of rotation of the motor and the angular velocity of rotation of the link into a disturbance observer, and calculates an estimated value of the intended torque applied by a wearer.

Another aspect of the present inventive concept encompasses a method of extracting intended torque for a wearable robot, in which an angle or angular velocity of rotation of a motor driving a joint and an angle or angular velocity of rotation of a link connected to the joint are used. The method includes a motor torque calculating step of calculating motor torque from the angular velocity of rotation of the motor. A link rotation calculating step calculates the angular velocity of rotation of the link. An intended torque calculating step substitutes the motor torque and the angular velocity of rotation of the link into a disturbance observer, and calculates an estimated value of the intended torque applied by a wearer.

Here, the motor torque calculating step may include adding a component, which is obtained by removing the angle of rotation of the link from the angle of rotation of the motor and by performing proportional control on the removed result, to a component, which is obtained by removing sensor noise from the angular velocity of rotation of the motor and by performing differential control on the removed result, removing the intended torque estimated value from the added result, and calculating the motor torque.

Further, the intended torque calculating step may include multiplying the angular velocity of rotation of the link by an inverse function of a nominal model of the link, calculating an estimated value of the motor torque, removing the motor torque from the calculated result, passing the removed result through a Q filter, and calculating the estimated value of the intended torque.

Meanwhile, the method may further include a motor controlling step of adding the intended torque estimated value to demand torque, removing a friction torque estimated value from the added result, obtaining fixed demand torque, and controlling the motor according to the fixed demand torque.

Further, the motor controlling step may include substituting the angle of rotation of the motor and the angular velocity of rotation of the motor into an extended-kalman filter and calculating the estimated value of the friction torque.

According to a method and system for extracting intended torque for a wearable robot which have the above-mentioned structure, the friction of a driver may be removed using an extended-kalman filter without a separate force-torque sensor, and then the intended torque of a wearer can be extracted using a disturbance observer used for existing disturbance prediction.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
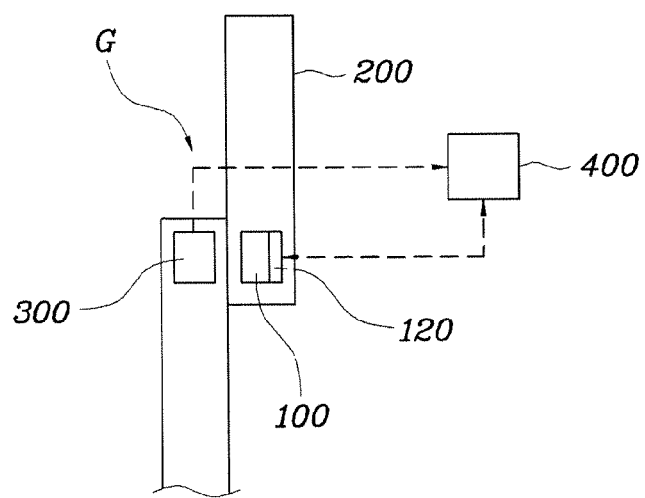
FIG. 1 is a configuration view of a system for extracting intended torque for a wearable robot in accordance with an embodiment of the present inventive concept.

Examples of the present inventive concept will be described below in more detail with reference to the accompanying drawings. The examples of the present inventive concept may, however, be embodied in different forms and should not be construed as limited to the examples set forth herein. Like reference numerals may refer to like elements throughout the specification.

Hereinafter, a method and system for extracting intended torque for a wearable robot according to an exemplary embodiment of the present inventive concept will be described in detail with reference to the accompanying drawings.

FIG. 1 is a configuration view of a system for extracting intended torque for a wearable robot in accordance with an embodiment of the present inventive concept. The system for extracting intended torque for a wearable robot may include a motor sensor 120 measuring an angle or angular velocity of rotation of a motor 100 driving a joint G, a link sensor 300 measuring an angle or angular velocity of rotation of a link 200 connected to the joint G, and a controller 400 substituting motor torque calculated from the angular velocity of rotation of the motor 100 and the angular velocity of rotation of the link 200 into a disturbance observer and calculating an estimated value of the intended torque applied by a wearer.

To describe the disturbance observer briefly, the disturbance observer is generally an algorithm that assumes a difference between an output based on a mathematical model of a system and a real output of the system to be disturbance, and compensates for an input using the observed disturbance. If a modeling error of the system is not great, a controller that is robust against the disturbance can be designed by this disturbance compensation.

Referring to FIG. 1, the link 200 may be connected to the joint G of the robot via the motor 100. In the event of operation of the wearer, the operation of the wearer may be detected by rotary encoders of the motor sensor 120 and the link sensor 300. Thus, driving of the motor 100 may be controlled to compensate for friction of the joint G, and the intended torque of the wearer is detected.

Figure 2:
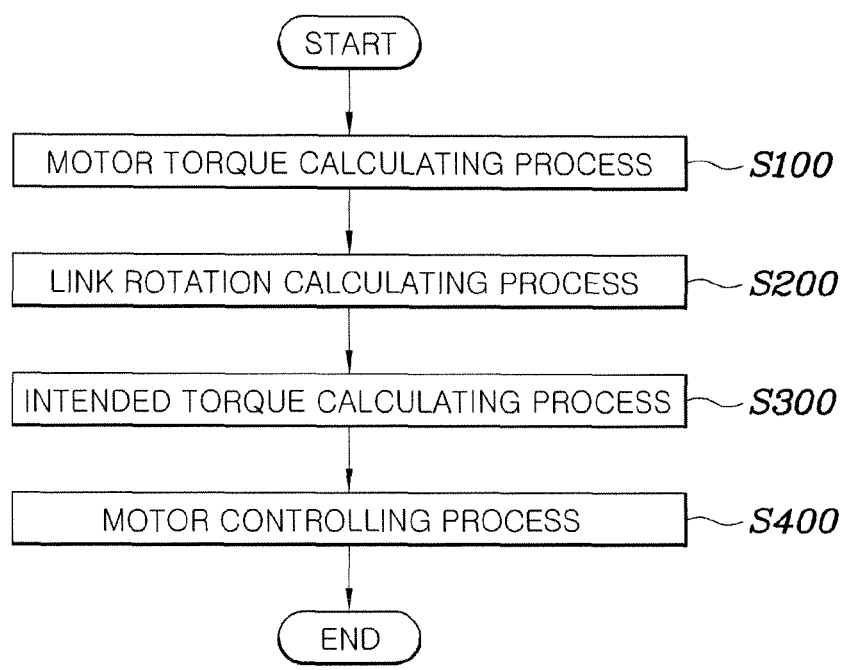
FIG. 2 is a flow chart of a method of extracting intended torque for a wearable robot in accordance with an embodiment of the present inventive concept.

FIG. 2 is a flow chart of a method of extracting intended torque for a wearable robot in accordance with an embodiment of the present inventive concept. The method of extracting intended torque for a wearable robot may make use of an angle or angular velocity of rotation of a motor driving a joint and an angle or angular velocity of rotation of a link connected to the joint. The method may include a motor torque calculating process S100 of calculating motor torque from the angular velocity of rotation of the motor, a link rotation calculating process S200 of calculating the angular velocity of rotation of the link, and an intended torque calculating process S300 of substituting the calculated motor torque and the calculated angular velocity of rotation of the link into a disturbance observer and calculating an estimated value of the intended torque applied by a wearer.

The motor torque calculating process S100 may include adding a component, which is obtained by removing the angle of rotation of the link from the angle of rotation of the motor and by performing proportional control on a result of the removal of the rotation angle, to a component, which is obtained by removing sensor noise from the angular velocity of rotation of the motor and by performing differential control on a result of the removal of the sensor noise. and the motor torque calculating process S100 may remove the intended torque estimated value from a result of the addition. Thereby, the motor torque can be calculated.

Further, the intended torque calculating process S300 may include multiplying the angular velocity of rotation of the link by an inverse function of a nominal model of the link, calculating an estimated value of the motor torque, removing the motor torque from a result of the calculation, and passing a result of the removal of the motor torque through a Q filter. Thereby, the estimated value of the intended torque can be calculated.

The method may further include a motor controlling process S400 of adding the intended torque estimated value to demand torque, removing a friction torque estimated value from a result of the addition, obtaining fixed demand torque, and controlling the motor according to the fixed demand torque. In the motor controlling process S400, the estimated value of the friction torque can be calculated by substituting the angle of rotation of the motor and the angular velocity of rotation of the motor into an extended-kalman filter (EKF).

Figure 3:
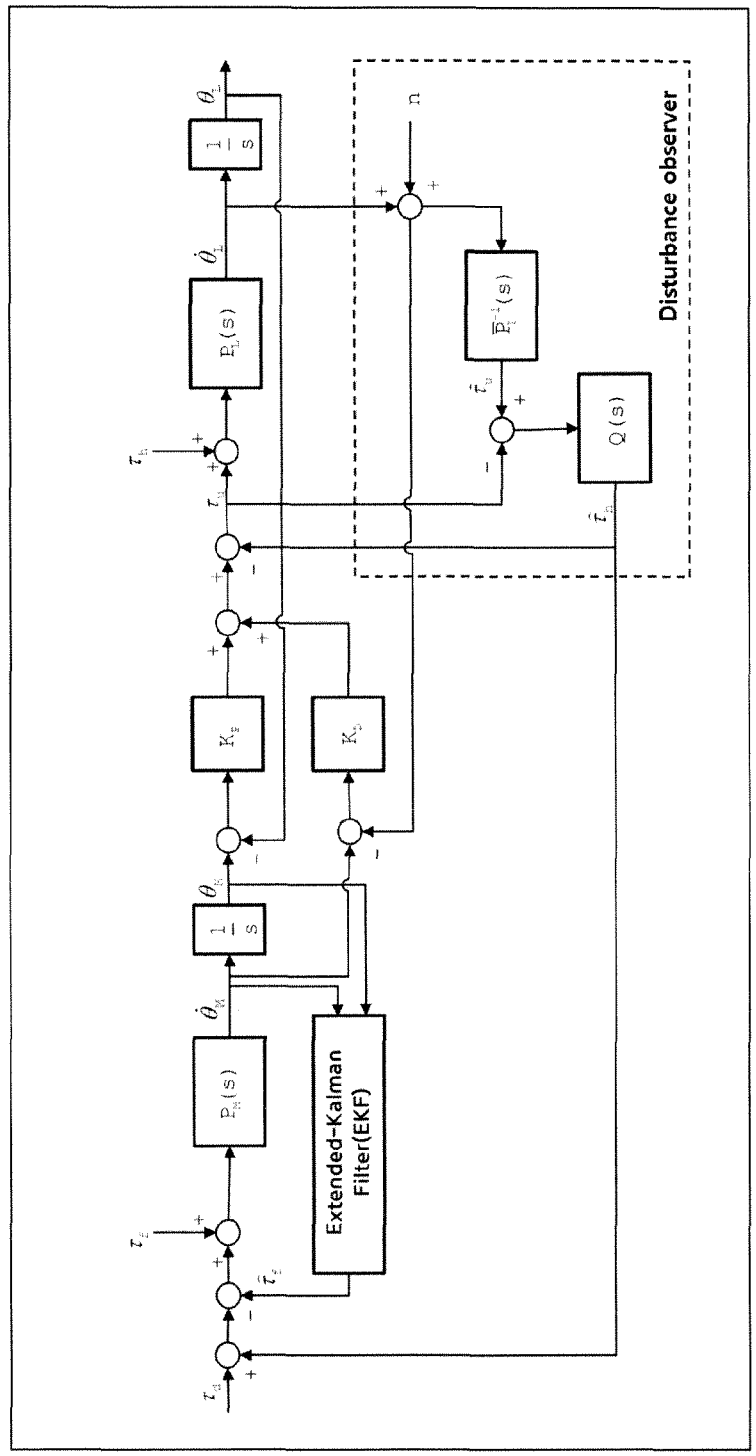
FIG. 3 is a block diagram of a method of extracting intended torque for a wearable robot in accordance with the embodiment of the present inventive concept.

FIG. 3 is a block diagram of a method of extracting intended torque for a wearable robot in accordance with an embodiment of the present inventive concept. The method will be described in greater detail with reference to FIG. 3.

First, demand torque $\tau_d$ for driving the robot by a wearer may be calculated. An estimated value $\hat{\tau}_h$ of intended torque of the wearer may be added to the demand torque $\tau_d$. An estimated value $\hat{\tau}_f$ of friction torque $\tau_f$ may be removed from a result of the addition of the estimated intended torque value. Thereby, final demand torque is obtained.

The demand torque $\tau_d$ may be set to 0 (zero) if the wearer does not lift a heavy object. In contrast, if the wearer lifts a heavy object, the demand torque $\tau_d$ may be set so as to apply necessary torque according to the situation. Further, it can be understood that a variety of kinds of torque are applied for reaction of the robot during gravity compensation. Thus, the final demand torque may be input to the motor under the control of current through the intent of the wearer and friction compensation.

In this case, a motor $P_M(S)$ may output torque from the final demand torque by an instructed value. This results from intervention of the friction torque due to a physical limit. Thus, in the present inventive concept, this friction torque may be estimated, and the estimated value $\hat{\tau}_f$ may be removed.

Thereby, the friction torque can be reflected on the final demand torque.

Meanwhile, in the motor, the angle $\theta_M$ of rotation of the motor and the angular velocity $\dot{\theta}_M$ of rotation of the motor are derived according to the output. The angle $\theta_M$ and the angular velocity $\dot{\theta}_M$ may be measured or calculated by a motor sensor.

In the extended-Kalman filter (EKF), the estimated value $\hat{\tau}_f$ of the friction torque may be obtained in a non-linear section by the angle $\theta_M$ of rotation of the motor and the angular velocity $\dot{\theta}_M$ of rotation of the motor. To obtain the friction torque by substituting the angle $\theta_M$ and angular velocity $\dot{\theta}_M$ of rotation, input of the EKF is set to $$X = \begin{bmatrix} \theta \\ \dot{\theta} \\ \tau_f \end{bmatrix},$$

and output of the EKF may be set to $$\hat{X} = \begin{bmatrix} \hat{\theta} \\ \hat{\dot{\theta}} \\ \hat{\tau}_f \end{bmatrix}.$$

Then, the estimated value $\hat{\tau}_f$ of the friction torque is obtained. For this input, a relational expression of $\dot{\tau}_f = f(\theta, \dot{\theta}, \tau_f)$ may be used. To derive the relational expression, a variety of non-linear friction models such as a Dahl's friction model may be used.

The value obtained by removing the angle $\theta_L$ of rotation of the link from the angle $\theta_M$ of rotation of the motor and by performing the proportional control $K_P$ on a result of the removal of the angle $\theta_L$ may be added to the value obtained by removing the angular velocity $\dot{\theta}_L$ of rotation of the link from the angular velocity $\dot{\theta}_M$ of rotation of the motor and by performing the differential control $K_D$ on a result of the removal of the angular velocity $\dot{\theta}_L$. The intended torque estimated value $\hat{\tau}_h$ may be removed from a result of the addition. Thereby, link torque $\tau_u$ is obtained. Consequently, the link $P_L(S)$ may be driven by adding the link torque $\tau_u$ caused by the motor to an intended torque real value $\tau_h$ actually applied by the wearer.

In the disturbance observer, the angular velocity $\dot{\theta}_L$ of rotation of the link to which noise n is added is substituted into an inverse transfer function $P_L^{-1}(S)$ of the link, thereby obtaining an estimated value $\hat{\tau}_u$ of the link torque. The link torque $\tau_u$ may be removed from the obtained result. A result of the removal of the link torque $\tau_u$ may be substituted into the Q filter, thereby obtaining an intended torque estimated value $\hat{\tau}_h$. The intended torque estimated value is fed back to the input of the motor again, and is used to calculate the final demand torque.

As described above, the disturbance observer is generally an algorithm that assumes a difference between the output based on a mathematical model of the system and the real output of the system to be disturbance, and compensates for an input using the observed disturbance. If a modeling error of the system is not great, a controller that is robust against the disturbance can be designed by this disturbance compensation.

The typical disturbance observer compensates for unmodeled disturbance by observing a difference between control input u and output y that are multiplied by an inverse function of the nominal model as the disturbance and causing a signal of the difference to pass through the Q filter and to be applied to the control input. Here, the Q filter may be designed as a low pass filter to prevent noise of a measured signal and amplification of high-frequency input. An effect of the disturbance compensation may be greatly dependent on adjustment of an order or coefficient of the low pass filter used as the Q filter. As such, precise adjustment of the Q filter may be required.

As a cutoff frequency of the Q filter becomes high, an effect of interrupting the disturbance increases. However, since there is a problem with the noise of the measured signal, there may be a limitation to a settable frequency. As such, perfect interruption of the disturbance may actually be impossible. Thus, it may be necessary to have proper system modeling suitable for a desired problem phenomenon and a practical target of disturbance suppression.

According to a method and system of the present inventive concept for extracting intended torque for a wearable robot which have the above-mentioned structure, the friction of the driver may be removed using the EKF without a separate force-torque sensor, and then the intended torque of the wearer can be extracted using the disturbance observer used for existing disturbance prediction.

Thus, according to the present inventive concept, the friction torque and the intended torque can be calculated only by the rotary encoders of the motor and the link without an expensive heavy part such as a force-torque sensor. The friction torque and the intended torque may be reflected on the system, and thereby the wearable robot can be controlled so as to be more stable and fit for its intended purpose. That is, the intended torque may be estimated and subjected to positive feedback. Thus, the motor may be driven as intended by the wearer, and thereby the robot can be operated.

Although an exemplary embodiment of the present inventive concept has been described for illustrative purposes, those skilled in the art will appreciate that various modifications, additions and substitutions are possible, without departing from the scope and spirit of the inventive concept as disclosed in the accompanying claims.

What is claimed is:

1. A system for extracting an intended torque for a wearable robot, comprising:
    a motor sensor configured to measure an angle or angular velocity of rotation of a motor driving a joint;
    a link sensor configured to measure an angle or angular velocity of rotation of a link connected to the joint; and
    a controller configured to substitute a motor torque calculated from the angular velocity of rotation of the motor and the angular velocity of rotation of the link into a disturbance observer, and calculate an estimated value of the intended torque applied by a wearer,
    wherein the estimated value of the intended torque is added to a demand torque, an estimated value of a friction torque is removed from the added result, a fixed demand torque is obtained, and the motor is controlled according to the fixed demand torque, and
    the angle of rotation of the motor and the angular velocity of rotation of the motor are substituted into an extended-kalman filter, and the estimated value of the friction torque is calculated.

2. A method of extracting an intended torque for a wearable robot, in which an angle or angular velocity of rotation of a motor driving a joint and an angle or angular velocity of rotation of a link connected to the joint are used, the method comprising:

a motor torque calculating step of calculating, by a controller, a motor torque from the angular velocity of rotation of the motor;

a link rotation calculating step of calculating, by the controller, the angular velocity of rotation of the link;

an intended torque calculating step of substituting, by the controller, the motor torque and the angular velocity of rotation of the link into a disturbance observer, and calculating an estimated value of the intended torque applied by a wearer; and a motor controlling step of adding, by the controller, the estimated value of the intended torque to a demand torque, removing an estimated value of a friction torque from the added result, obtaining a fixed demand torque, and controlling the motor according to the fixed demand torque, wherein the motor controlling step includes substituting, by the controller, the angle of rotation of the motor and the angular velocity of rotation of the motor into an extended-kalman filter, and calculating the estimated value of the friction torque.

3. The method according to claim 2, wherein the motor torque calculating step includes:

adding a component, which is obtained by removing the angle of rotation of the link from the angle of rotation of the motor and by performing proportional control on the removed result, to a component, which is obtained by removing sensor noise from the angular velocity of rotation of the motor and by performing differential control on the removed result, removing, by the controller, the intended torque estimated value from the added result, and calculating, by the controller, the motor torque.

4. The method according to claim 2, wherein the intended torque calculating step includes:

multiplying, by the controller, the angular velocity of rotation of the link by an inverse function of a nominal model of the link, calculating, by the controller, an estimated value of the motor torque, removing, by the controller, the motor torque from the calculated result, passing, by the controller, the removed result through a Q filter, and calculating, by the controller, the estimated value of the intended torque.

5. A non-transitory computer readable recording medium comprising instructions embodied thereon which cause the controller to execute the method of claim 2.

* * * * *